(12) United States Patent
Smith

(10) Patent No.: US 8,636,242 B2
(45) Date of Patent: Jan. 28, 2014

(54) PROPULSIVE ANTI-TORQUE NOZZLE SYSTEM WITH EXTERNAL ROTATING SLEEVE FOR A ROTORCRAFT

(75) Inventor: Dudley E. Smith, Arlington, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 13/579,002

(22) PCT Filed: Nov. 12, 2010

(86) PCT No.: PCT/US2010/056557
§ 371 (c)(1),
(2), (4) Date: Aug. 14, 2012

(87) PCT Pub. No.: WO2012/064343
PCT Pub. Date: May 18, 2012

(65) Prior Publication Data
US 2012/0318910 A1    Dec. 20, 2012

(51) Int. Cl.
*B64C 15/00* (2006.01)
*B64C 27/82* (2006.01)

(52) U.S. Cl.
USPC .................................... 244/17.19; 244/52

(58) Field of Classification Search
USPC ......... 244/17.19, 17.11, 52, 12.3, 12.5, 23 B, 244/23 D, 73 R
See application file for complete search history.

(56) References Cited

U.S. PATENT DOCUMENTS

| | | | |
|---|---|---|---|
| 2,486,272 A | 10/1949 | Gazda | |
| 3,401,886 A | * 9/1968 | Osborn | ........................... 244/52 |
| 4,200,252 A | 4/1980 | Logan | |
| 4,660,785 A | 4/1987 | Munski | |
| 6,021,976 A | 2/2000 | Exter | |

FOREIGN PATENT DOCUMENTS

GB    2320477 A    6/1998

OTHER PUBLICATIONS

International Search Report and the Written Opinion of the International Searching Authority mailed by ISA/USA, U.S. Patent and Trademark Office on Jan. 18, 2011 for International Patent Application No. PCT/US10/56557, 7 pages.
Extended European Search Report in related European patent application No. 10859399, mailed Jul. 23, 2013, 5 pages.

* cited by examiner

*Primary Examiner* — Tien Dinh
*Assistant Examiner* — Richard R Green
(74) *Attorney, Agent, or Firm* — James E. Walton

(57) ABSTRACT

The system of the present application includes a system duct in fluid communication with a tailboom duct, the system duct having a downstream portion with an anti-torque cutout and a pro-torque cutout. The system further includes an anti-torque nozzle exteriorly proximate to the anti-torque cutout and a pro-torque nozzle exteriorly proximate to the pro-torque cutout. A rotating sleeve is configured to selectively allow airflow into at least one of the anti-torque nozzle and the pro-torque nozzle. A thrust nozzle is in fluid communication with the system duct. An upper clamshell and a lower clamshell are each configured to selectively control airflow in the thrust nozzle.

19 Claims, 5 Drawing Sheets

PROPULSIVE ANTI-TORQUE NOZZLE SYSTEM WITH EXTERNAL ROTATING SLEEVE FOR A ROTORCRAFT

TECHNICAL FIELD

The present application relates to rotorcraft. In particular, the present application relates to propulsive anti-torque systems for rotorcraft.

DESCRIPTION OF THE PRIOR ART

A classic helicopter configuration includes a tail rotor for selectively producing a torque upon the helicopter. Helicopters having a single main rotor require a torque canceling device for controlling torque reacting on the airframe from the main rotor. Typically, the torque canceling device is a tail rotor powered by the engine via a tail rotor driveshaft. Conventional tail rotors are unable to provide propulsive force to the helicopter.

Although the developments in helicopter torque systems have produced significant improvements, considerable shortcomings remain.

BRIEF DESCRIPTION OF THE DRAWINGS

The novel features believed characteristic of the system of the present application are set forth in the appended claims. However, the system itself, as well as a preferred mode of use, and further objectives and advantages thereof, will best be understood by reference to the following detailed description when read in conjunction with the accompanying drawings, in which the leftmost significant digit(s) in the reference numerals denote(s) the first figure in which the respective reference numerals appear, wherein:

Figure 1:
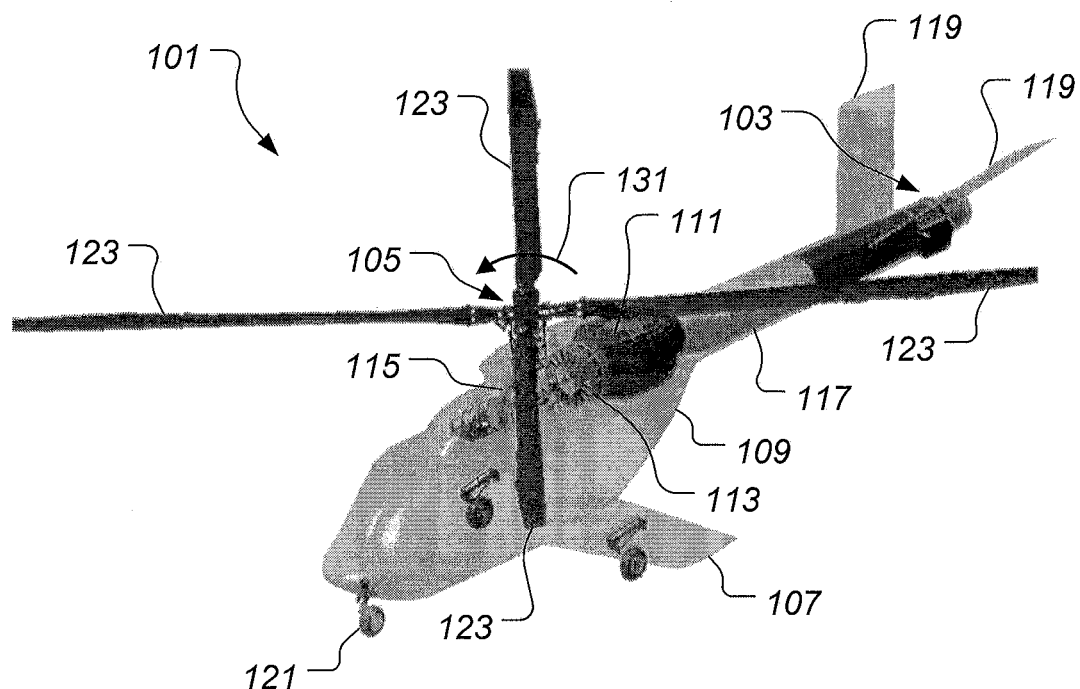
FIG. 1 is a perspective view of a rotorcraft having a propulsive anti-torque system according to the preferred embodiment of the present application.

While the system of the present application is susceptible to various modifications and alternative forms, specific embodiments thereof have been shown by way of example in the drawings and are herein described in detail. It should be understood, however, that the description herein of specific embodiments is not intended to limit the method to the particular forms disclosed, but on the contrary, the intention is to cover all modifications, equivalents, and alternatives falling within the spirit and scope of the application as defined by the appended claims.

DESCRIPTION OF THE PREFERRED EMBODIMENT

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The propulsive anti-torque system of present application is configured to operate in an aircraft, the aircraft having with a propulsion system with a variable pitch fan installed approximate to an engine in the aircraft. The engine drives a short shaft to the transmission. The fan is attached coincident with the shaft and is driven by the shaft. The configuration and location of the fan allows the primary exhaust from the engine to be mixed with the air flow from the fan. The mixed air flow from the fan and the engine passes through the tail boom and out the propulsive anti-torque system. All embodiments of the system of the present application may be configured in both manned and unmanned aircraft.

Figure 2:
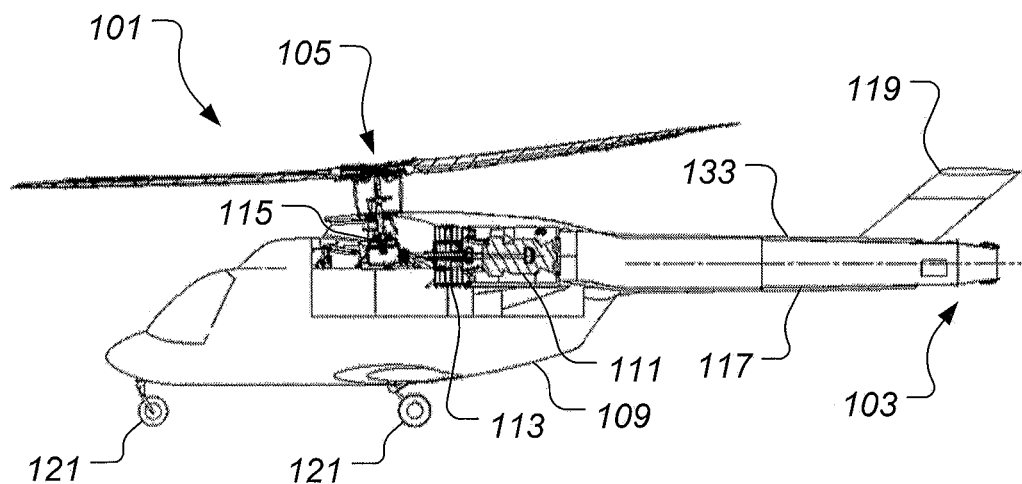
FIG. 2 is a partial cut-away side view of the rotorcraft of FIG. 1.

Referring to FIGS. 1 and 2, aircraft 101 includes a fuselage 109 and a landing gear 121. A rotor system 105 is configured to receive cyclic and collective control inputs thus enabling aircraft 101 to make controlled movements. For example, a collective control input changes the pitch of each rotor blade 123 collectively. In contrast, a cyclic control inputs selectively changes the pitch of individual rotor blades according to a rotation position. For example, as rotor blades 123 rotate, a cyclic input can increase the lift on one side of aircraft 101 and decrease on the other side of the aircraft 101, thus producing a lift differential. In this manner, cyclic control inputs can be made to control the pitch and roll of aircraft, as well as to produce various tilting maneuvers. Even though the preferred embodiment is shown with four rotor blades 123, it should be appreciated that alternative embodiments may use greater or fewer rotor blades.

In the preferred embodiment, aircraft 101 includes a fixed wing 107 extending from each side of fuselage 109. Fixed wing 107 is configured to provide supplemental lift to aircraft 101 during forward flight. During forward flight, wing 107 produces lift, thereby reducing the lifting responsibilities of rotor system 105. The supplemental lift provided by wing 107 acts to reduce vibration, as well as improve the range and efficiency of aircraft 101. It should be appreciated that alternative embodiments of aircraft 101 may not include wing 107. The preferred embodiment of aircraft 101 also includes tail fins 119 which provide aerodynamic stability during flight. It should be appreciated that tail fins 119 may take on a wide variety of configurations. For example, tail fins 119 may be replaced with any combination of horizontal and vertical fins.

Aircraft 101 further includes an engine 111 that provides power to rotor system 105 via a transmission 115. Engine 111 is also configured to provide power to a fan 113. Fan 113 provides compressed airflow to propulsive anti-torque system 103, via a duct 117. In the preferred embodiment, fan 113 has variable pitch fan blades so that flight system controls can control airflow produced by fan 113. Propulsive anti-torque system 103 is configured to selectively provide aircraft with a forward thrust vector, an anti-torque vector, a pro-torque vector, and positive and negative vertical components of thrust for trim capability, as described in further detail herein.

Figure 3:
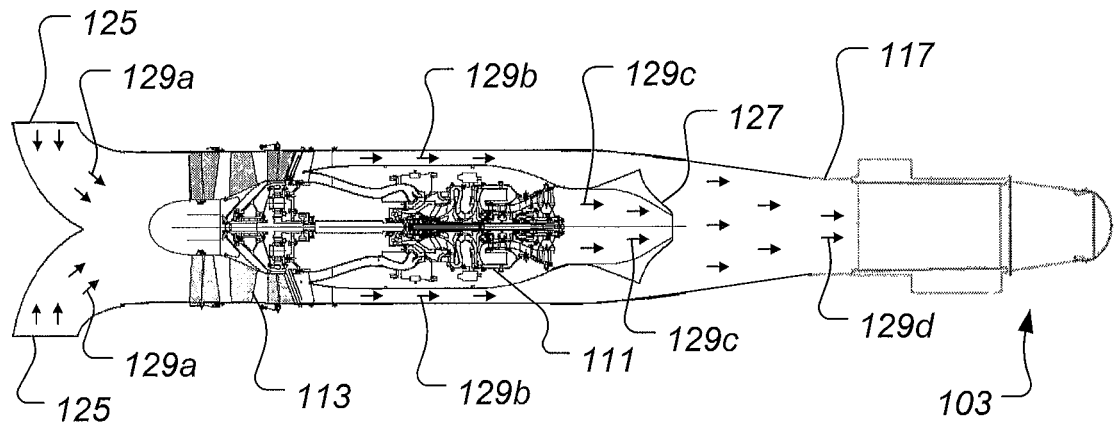
FIG. 3 is a schematic view of a selected portion of the rotorcraft of FIG. 1.
Figure 4:
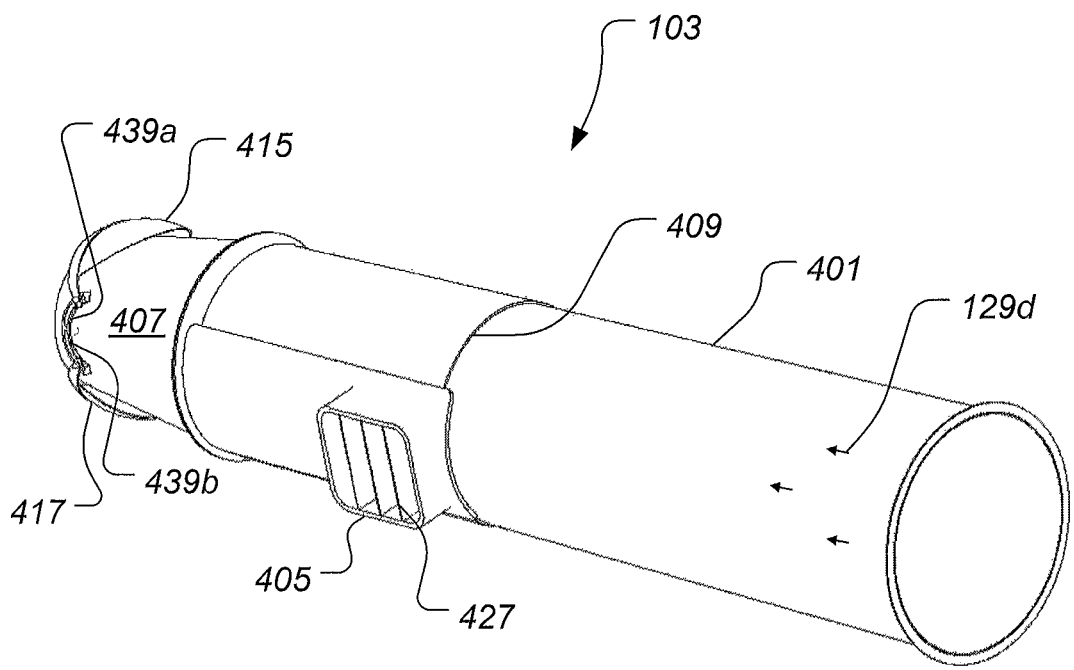
FIG. 4 is a perspective view of the propulsive anti-torque system according the preferred embodiment of the present application.

Referring now to FIG. 3, a portion of aircraft 101 is schematically shown. Propulsive anti-torque system 103 receives compressed air flow via duct 117. Duct 117 is interior to a tailboom 133. During operation, inlet air 129a enters an inlet 125 and is accelerated through fan 113. Fan accelerated air 129b travels through a duct system around engine 111 to a mixer portion 127 of duct 117. Exhaust air 129c is expelled from engine 111 and travels to mixer portion 127. Mixer portion 127 is a daisy-type nozzle that provides shear layers for disrupting airflow so as to facilitate mixing of fan accelerated air 129b and exhaust air 129c so as to produce mixed air 129d. The mixing of the hot exhaust air 129c with the cool fan accelerated air 129b acts to reduce the temperature of exhaust air 129c, thereby reducing the infrared (IR) signature of aircraft 101. Additionally, the mixing of the exhaust with the cool flow recovers the waste heat energy in the exhaust, so as to produce thrust more efficiently. External acoustic signature is also reduced because the fan and engine components are located internally and sound is dampened in duct 117, before mixed air 129d exits propulsive anti-torque system 103.

Referring now to FIGS. 4-8, propulsive anti-torque system 103 is shown in further detail. A system duct 401 is configured to receive mixed air 129d from duct 117 within tailboom 133. A downstream portion of system duct 401 includes an anti-torque duct cutout 413a and a pro-torque duct cutout 413b. A rotating sleeve 409 is configured to rotate in a sleeve rotating direction 429 so as to selectively allow airflow through anti-torque duct cutout 413a and pro-torque duct cutout 413b. In the preferred embodiment, rotating sleeve 409 is located about the exterior of system duct 401. Further, rotating sleeve 409 is preferably concentric with system duct 401. An alternative embodiment of system 103 may include a rotating sleeve which is located inside system duct 401. Preferably, rotating sleeve 409 includes an anti-torque sleeve cutout 411a and a pro-torque sleeve cutout 411b. Anti-torque sleeve cutout 411a, and the corresponding anti-torque nozzle 403, are sized approximately 30% larger than the pro-torque sleeve cutout 411b, and the corresponding pro-torque nozzle 405, because anti-torque thrust must overcome both the main rotor torque and provide necessary maneuver capability.

Figure 7:
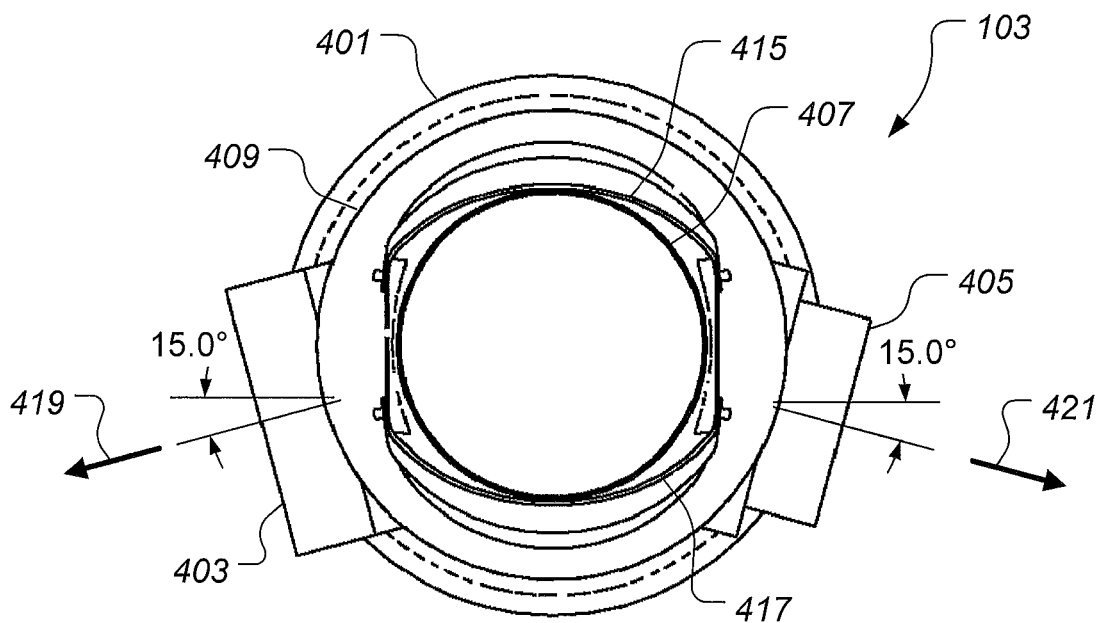
FIG. 7 is an end view of the propulsive anti-torque system according the preferred embodiment of the present application.

Anti-torque nozzle 403 and pro-torque nozzle 405 are each coupled to duct 401 in a configuration which allows rotating sleeve 409 to rotate about an axis that is concentric with an axis of duct 401. Preferably, rotating sleeve 409 is located exterior to duct 401, but interior to anti-torque nozzle 403 and pro-torque nozzle 405. During operation, an actuator selectively positions rotating sleeve 409 so as to selectively direct air 129d into anti-torque nozzle 403, pro-torque nozzle 405, or a combination of anti-torque nozzle 403 and pro-torque nozzle 405. Additionally, rotating sleeve 409 may be positioned to prevent air from flowing through either anti-torque nozzle 403 or pro-torque nozzle 405, therefore forcing the air to flow solely through thrust nozzle 407. Anti-torque nozzle 403 preferably has one or more vertically aligned anti-torque vanes 425 for directing the flow of mixed air 129d in an anti-torque direction. In the preferred embodiment, each anti-torque vane 425 is fixed to the interior side walls of anti-torque nozzle 403. In alternative embodiments, each anti-torque vane 425 may be articulated such that each vane 425 can be selectively turn and provide forward and aft vector contributions to anti-torque vector 419. During operation, rotating sleeve 409 directs air through anti-torque nozzle 403 so as to produce an anti-torque vector 419 from the propulsive forces of air 129d being directed through anti-torque nozzle 403. In the preferred embodiment, anti-torque nozzle 403 is positioned approximately 15 degrees downward from horizontal, as shown in FIG. 7, to provide a vertical component of thrust for pitch trim capability. It should be appreciated that alternative embodiments may have anti-torque nozzle 403 positioned at other angles, or even level with horizontal.

Pro-torque nozzle 405 preferably has one or more pro-torque vanes 427 for directing the flow of mixed air 129d in the desired pro-torque direction. In the preferred embodiment, each pro-torque vane 427 is fixed to the interior side walls of pro-torque nozzle 405. In alternative embodiments, each pro-torque vane 425 may be articulated such that each vane 427 may be articulated to selectively turn and provide forward and aft vector contributions to pro-torque vector 421. During operation, rotating sleeve 409 directs air through pro-torque nozzle 405 so as to produce a pro-torque vector 421 from the propulsive forces of air 129d being directed through pro-torque nozzle 405. Furthermore, pro-torque vector 421 is selectively generated for yaw maneuvering and yaw stability. In the preferred embodiment, pro-torque nozzle 405 is positioned approximately 15 degrees downward from horizontal, as shown in FIG. 7, to provide a vertical component of thrust for pitch trim capability. It should be appreciated that alternative embodiments may have pro-torque nozzle 405 positioned at other angles, or even level with horizontal.

Aircraft 101 is configured such that rotor system 105 rotates in a counter clockwise direction 131, as shown in FIG. 1. In such a configuration, anti-torque vector 419 acts to cancel torque induced upon aircraft from the rotation of rotor system 105 in counter clockwise direction 131. Furthermore, anti-torque vector 419 is selectively generated for yaw maneuvering and yaw stability, in addition to anti-torque control. It should be appreciated that other embodiments of aircraft 101 may have a rotor system which rotates is a clockwise direction (opposite from counter clockwise direction 131). In such a configuration, propulsive anti-torque system 103 would be configured such that anti-torque nozzle 403 would be on the opposite side of aircraft 101. It should be appreciated that anti-torque nozzle 403 is approximate 30% larger than pro-torque nozzle 405 since anti-torque nozzle 403 is configured to cancel torque from rotor system 105, in addition to providing yaw stability and yaw maneuvering control.

Figure 5:
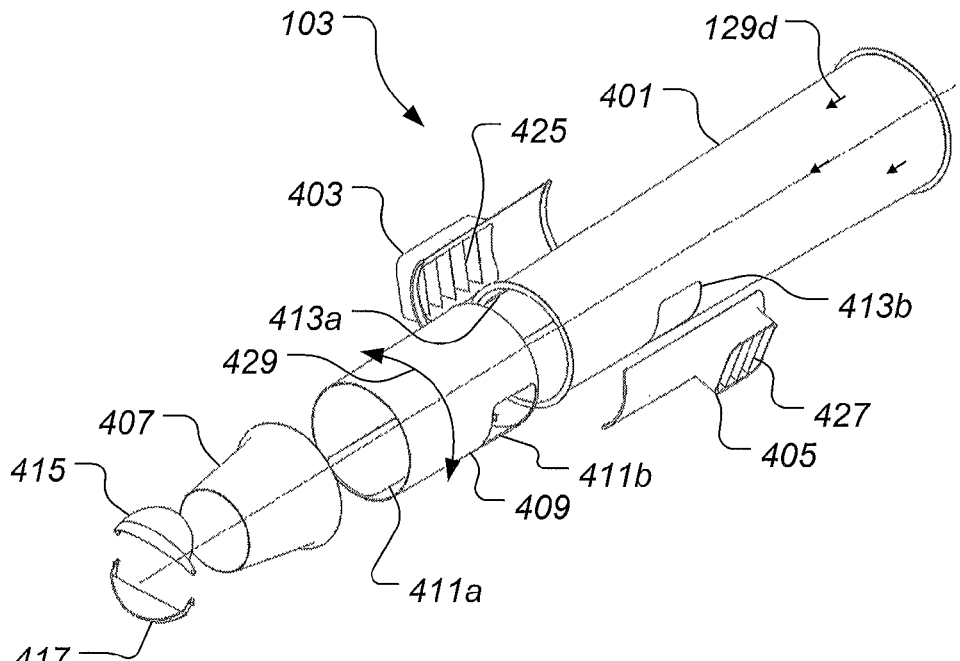
FIG. 5 is an exploded view of the propulsive anti-torque system according the preferred embodiment of the present application.
Figure 6:
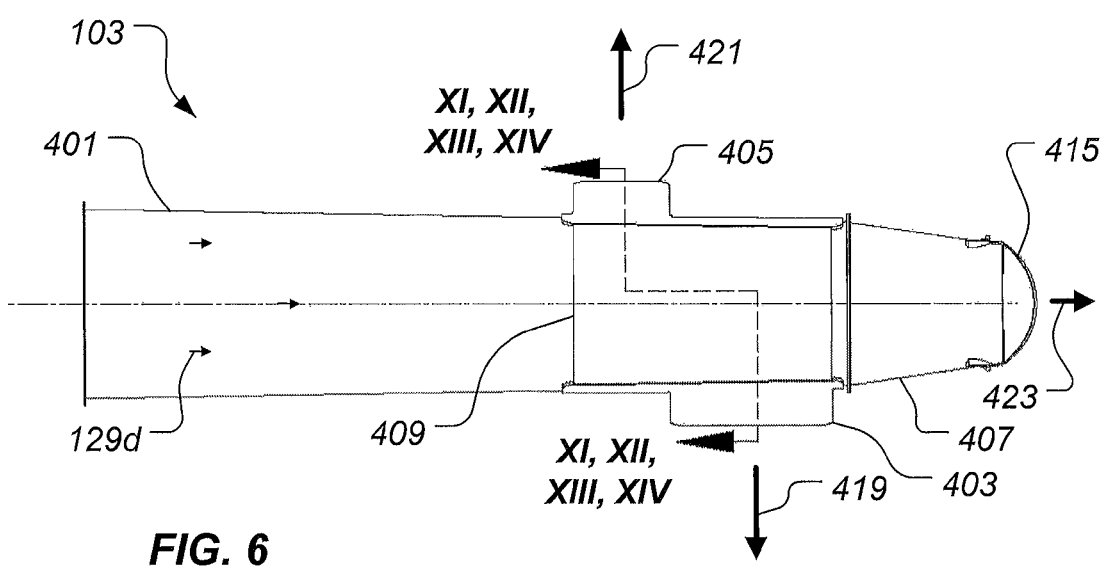
FIG. 6 is a top view of the propulsive anti-torque system according the preferred embodiment of the present application.
Figure 8:
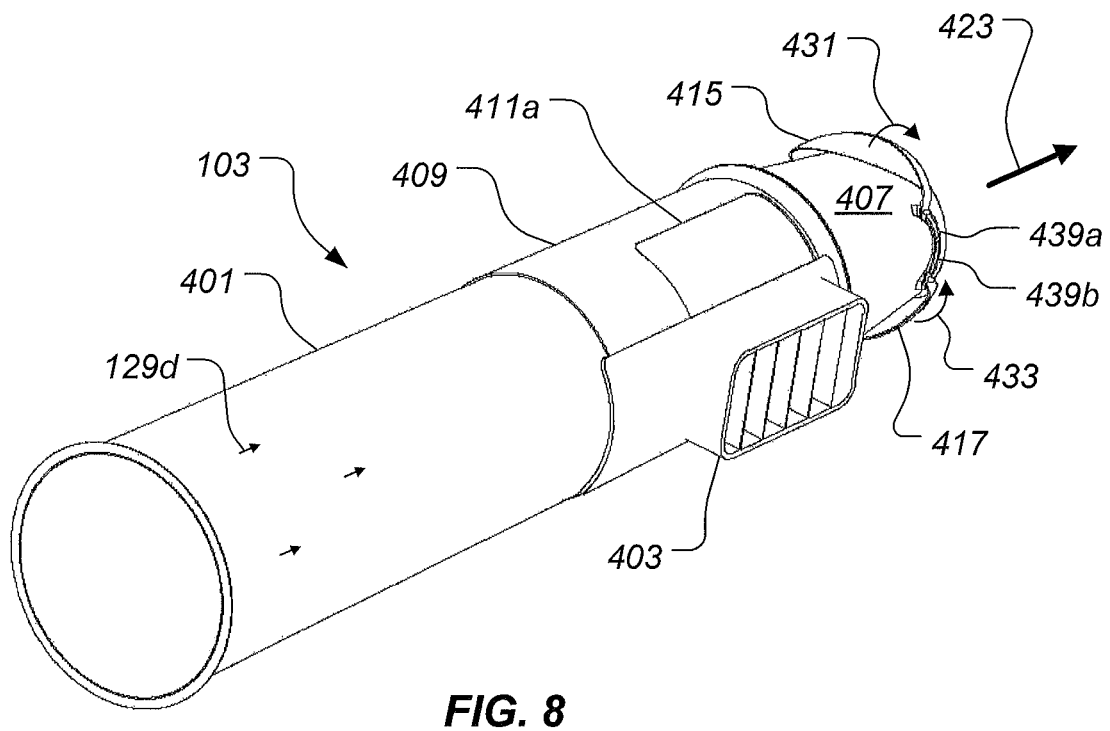
FIG. 8 is a perspective view of the propulsive anti-torque system according the preferred embodiment of the present application.
Figure 9:
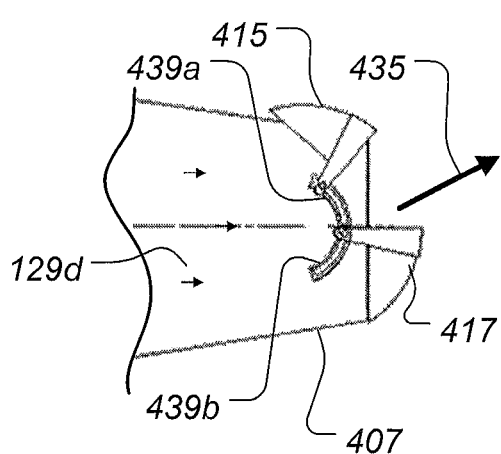
FIG. 9 is a side view of an aft portion of the propulsive anti-torque system according to the preferred embodiment of the present application.
Figure 10:
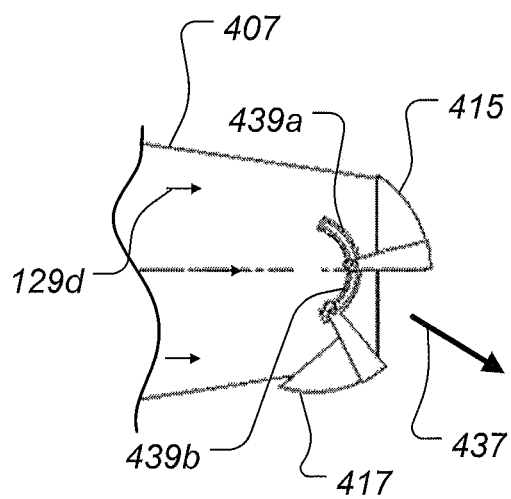
FIG. 10 is a side view of an aft portion of the propulsive anti-torque system according to the preferred embodiment of the present application.

Referring now also to FIGS. 9 and 10, thrust nozzle 407 is preferably cone shaped so as to gradually decrease in diameter toward an aft direction, as shown in FIG. 5. An upper clamshell 415 and a lower clamshell 417 are configured to selectively control airflow (and thrust) through thrust nozzle 407. In the preferred embodiment, upper clamshell 415 and lower clamshell 417 are each individually controlled by a separate actuator so as to have to ability to operate asymmetrically. In an alternative embodiment, upper clamshell 415 and lower clamshell 417 may be operated symmetrically by a single actuator. In operation, a forward thrust vector 423 is produced when both upper clamshell 415 and lower clamshell 417 are each open, as shown in FIG. 8. An upward thrust vector 435 is selectively generated by positioning upper clamshell 415 open and lower clamshell 417 closed. Similarly, a downward thrust vector 437 is selectively generated by positioning upper clamshell 415 closed and lower clamshell 417 open. Upper clamshell 415 and lower clamshell 417 may both be closed so as prevent air from flowing through thrust nozzle 407. In such a manner, upper clamshell 415 and lower clamshell 417 are selectively controlled to contribute to pitch control, in addition to providing forward thrust. For example, upward thrust vector 435 (as shown in FIG. 9) results in a moment which acts to pitch up the nose of aircraft 101, while also contributing to lift of aircraft 101. Similarly, downward thrust vector 437 (as shown in FIG. 10) results in a moment which acts to pitch down the nose of aircraft 101. Upper clamshell 415 is preferably actuated along upper clamshell track 439a in the direction 431 (shown in FIG. 8). Similarly, lower clamshell 417 is preferably actuated along lower clamshell track 439b in the direction 433 (shown in FIG. 8).

Figure 11:
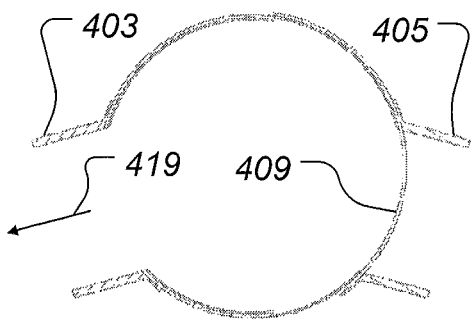
FIG. 11 is a cross-sectional view of the propulsive anti-torque system according to the preferred embodiment of the present application, taken along the line XI-XI in FIG. 6.
Figure 12:
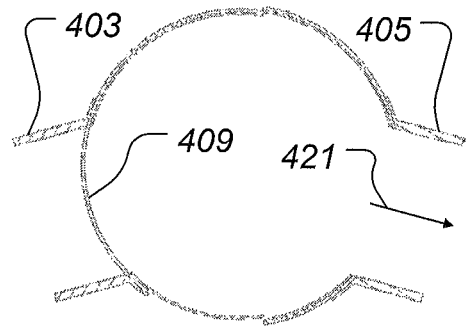
FIG. 12 is a cross-sectional view of the propulsive anti-torque system according to the preferred embodiment of the present application, taken along the line XII-XII in FIG. 6.
Figure 13:
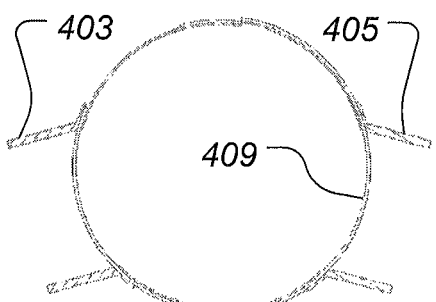
FIG. 13 is a cross-sectional view of the propulsive anti-torque system according to the preferred embodiment of the present application, taken along the line XIII-XIII in FIG. 6.
Figure 14:
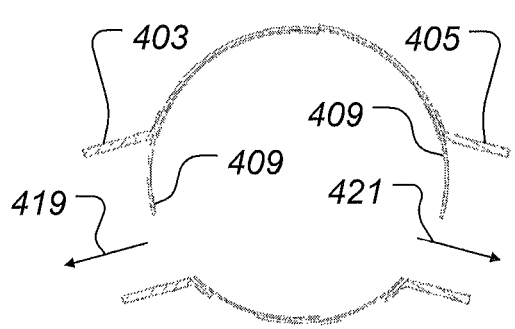
FIG. 14 is a cross-sectional view of the propulsive anti-torque system according to the preferred embodiment of the present application, taken along the line XIV-XIV in FIG. 6.

Referring now to FIGS. 11-14, during operation, rotating sleeve 409 is selectively actuated to direct air within propulsive anti-torque system 103 so as to selectively produce thrust in a desired direction. For example, FIG. 11 illustrates rotating sleeve 409 being positioned to direct air through anti-torque nozzle 403 to produce anti-torque vector 419, while air is prevented from flowing through pro-torque nozzle 405. FIG. 12 illustrates rotating sleeve 409 being positioned to direct air through pro-torque nozzle 405 to produce pro-torque vector 421, while air is prevented from flowing through anti-torque nozzle 403. FIG. 13 illustrates rotating sleeve 409 being positioned to prevent air from flowing through pro-torque nozzle 405 and anti-torque nozzle 403. FIG. 14 illustrates rotating sleeve 409 being positioned to direct air through both anti-torque nozzle 403 and pro-torque nozzle 405, so as to simultaneously produce to produce anti-torque vector 419 and pro-torque vector 421, respectively.

The system of the present application provides significant advantages, including: (1) increasing the speed of the aircraft; (2) blade loading and flapping are significantly reduced; (3) the margins for hub and control loads are improved; (4) the quality of the ride at high speeds is significantly improved; (5) the noise level is significantly reduced; (6) system complexity is greatly reduced; (7) the infrared (IR) signature of the rotorcraft is significantly reduced, because the primary engine exhaust is highly diluted when mixed with the air flow from the fan; (8) the acoustic signature of the rotorcraft is greatly reduced, because both the primary engine and the propulsive anti-torque system are internal to the tail boom of the rotorcraft; (9) the rotorcraft is significantly safer for personnel during ground operations, because both the primary engine and the propulsive anti-torque system are internal to the tail boom of the vehicle, thereby eliminating the possibilities of exposure to hot exhaust gasses or tail rotor strikes; and (10) anti-torque thrust is provided without the cost, weight, and complexity of a tail-rotor type device or a thrust type device that uses a fan driven by a secondary drive system.

The particular embodiments disclosed above are illustrative only, as the application may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the application. Accordingly, the protection sought herein is as set forth in the claims below. It is apparent that a system with significant advantages has been described and illustrated. Although the system of the present application is shown in a limited number of forms, it is not limited to just these forms, but is amenable to various changes and modifications without departing from the spirit thereof.

The invention claimed is:

1. A propulsive anti-torque system for an aircraft, the propulsive anti-torque system comprising:
   a system duct in fluid communication with a tailboom duct, the system duct having a downstream portion with an anti-torque cutout and a pro-torque cutout;
   an anti-torque nozzle exteriorly proximate to the anti-torque cutout;
   a pro-torque nozzle exteriorly proximate to the pro-torque cutout;
   a rotating sleeve configured to selectively allow airflow into at least one of the anti-torque nozzle and the pro-torque nozzle;
   a thrust nozzle in fluid communication with the system duct;
   an upper clamshell and a lower clamshell, each selectively controlled to contribute to pitch control and forward thrust, each controlled by a separate actuator so as to operate asymmetrically to alter the airflow through the system duct, the upper clamshell and lower clamshell having a curved shaped concaved to the flow of air so as to generate an upward thrust vector and a downward thrust vector.

2. The propulsive anti-torque system according to claim 1, wherein the rotating sleeve is concentric to the system duct.

3. The propulsive anti-torque system according to claim 1, wherein the airflow through the thrust nozzle produces a forward thrust vector on the aircraft.

4. The propulsive anti-torque system according to claim 1, wherein the airflow through the anti-torque nozzle produces an anti-torque vector, thereby producing a torque on the aircraft.

5. The propulsive anti-torque system according to claim 1, wherein the airflow through the pro-torque nozzle produces a pro-torque vector, thereby producing a torque on the aircraft.

6. The propulsive anti-torque system according to claim 1, wherein the airflow through the anti-torque nozzle and the thrust nozzle produces a resultant force which is a combination of an anti-torque vector and a thrust vector.

7. The propulsive anti-torque system according to claim 1, wherein the airflow is pressurized by an engine and a fan.

8. The propulsive anti-torque system according to claim 1, wherein the anti-torque nozzle comprises:
   at least one anti-torque vane for directing the airflow in an anti-torque producing direction.

9. The propulsive anti-torque system according to claim 1, wherein the pro-torque nozzle comprises:
   at least one pro-torque vane for directing the airflow in a pro-torque producing direction.

10. The propulsive anti-torque system according to claim 1, wherein the rotating sleeve is exterior to the system duct.

11. The propulsive anti-torque system according to claim 1, wherein the upper clamshell and the lower clamshell are configured to be actuated independently.

12. The propulsive anti-torque system according to claim 1, wherein the thrust nozzle is configured to produce an upward thrust vector when the lower clamshell is closed and the upper clamshell is open, thereby producing a pitching up moment on the aircraft.

13. The propulsive anti-torque system according to claim 1, wherein the thrust nozzle is configured to produce an downward thrust vector when the lower clamshell is open and the upper clamshell is closed, thereby producing a pitching down moment on the aircraft.

14. An aircraft comprising:
   an engine which provides power to a main rotor system;
   a fan;
   a tailboom duct that acts as a conduit to provide airflow to a propulsive anti-torque system, the airflow being a mixture of compressed air from the fan and exhaust from the engine; and
   a propulsive anti-torque system located near an aft end of the tailboom, the propulsive anti-torque system comprising:
   a system duct in fluid communication with the tailboom duct, the system duct having a downstream portion with an anti-torque cutout and a pro-torque cutout;
   an anti-torque nozzle exterior and proximate to the anti-torque cutout;
   a pro-torque nozzle exterior and proximate to the pro-torque cutout;
   a rotating sleeve configured to selectively allow airflow into at least one of the anti-torque nozzle and the pro-torque nozzle;
   a thrust nozzle in fluid communication with the system duct; and
   an upper clamshell and a lower clamshell, each selectively controlled to contribute to pitch control and forward thrust, each controlled by a separate actuator so as to operate asymmetrically to alter the airflow through the system duct, the upper clamshell and lower clamshell having a curved shaped concaved to the flow of air so as to generate an upward thrust vector and a downward thrust vector.

15. The aircraft according to claim 14, wherein the airflow through the thrust nozzle produces a forward thrust vector on the aircraft.

16. The aircraft according to claim 14, wherein the airflow through the anti-torque nozzle produces an anti-torque vector, thereby producing a torque on the aircraft.

17. The aircraft according to claim 14, wherein the airflow through the pro-torque nozzle produces a pro-torque vector, thereby producing a torque on the aircraft.

18. The aircraft according to claim 14, wherein the airflow through the anti-torque nozzle and the thrust nozzle produces a resultant force which is a combination of an anti-torque vector and a thrust vector.

19. The aircraft according to claim 14, wherein the airflow is pressurized by an engine and a fan.

\* \* \* \* \*